(12) United States Patent
Mullins et al.

(10) Patent No.: US 11,310,172 B2
(45) Date of Patent: Apr. 19, 2022

(54) NETWORK MAPPING AND ANALYTICS FOR BOTS

(71) Applicant: Microsoft Technology Licensing, LLC, Redmond, WA (US)

(72) Inventors: Christopher Lee Mullins, Sammamish, WA (US); David Shigeru Taniguchi, Kirkland, WA (US)

(*) Notice: Subject to any disclaimer, the term of this patent is extended or adjusted under 35 U.S.C. 154(b) by 226 days.

(21) Appl. No.: 16/247,385

(22) Filed: Jan. 14, 2019

(65) Prior Publication Data

US 2020/0228469 A1    Jul. 16, 2020

(51) Int. Cl.
```
G06F 15/16      (2006.01)
H04L 51/02      (2022.01)
H04L 67/50      (2022.01)
```

(52) U.S. Cl.
CPC ............. *H04L 51/02* (2013.01); *H04L 67/22* (2013.01)

(58) Field of Classification Search
CPC ................................ H04L 51/02; H04L 67/22
See application file for complete search history.

(56) References Cited

U.S. PATENT DOCUMENTS

| | | | | |
|---|---|---|---|---|
| 9,813,310 | B1* | 11/2017 | Sieracki | H04L 43/18 |
| 10,044,835 | B1* | 8/2018 | Shavell | H04L 67/42 |
| 10,686,834 | B1* | 6/2020 | Hitchcock | H04L 63/1408 |
| 2005/0216845 | A1* | 9/2005 | Wiener | G06F 16/951 |
| | | | | 715/745 |
| 2008/0189408 | A1 | 8/2008 | Cancel et al. | |
| 2010/0103925 | A1* | 4/2010 | Birch | H04Q 3/0045 |
| | | | | 370/352 |
| 2013/0073387 | A1* | 3/2013 | Heath | G06Q 30/02 |
| | | | | 705/14.53 |
| 2017/0237692 | A1 | 8/2017 | Sheth et al. | |
| 2018/0302349 | A1* | 10/2018 | Ban | H04L 51/04 |
| 2019/0073197 | A1* | 3/2019 | Collins | G06F 3/0486 |
| 2019/0102078 | A1* | 4/2019 | Bhatt | G06F 3/04847 |
| 2020/0125678 | A1* | 4/2020 | Conley | G06K 9/6247 |

OTHER PUBLICATIONS

Azure Bot Service; API reference. Standefer, et al., Oct. 24, 2018. 37 pages.
Azure Bot Service; Bot analytics. Standefer, et al. Dec. 3, 2018. 11 pages.
Bots and Artificial Intelligence. Shukla, Gaurav. Jul. 20, 2016, 7 pages.

(Continued)

*Primary Examiner* — Chris Parry
*Assistant Examiner* — Dixon F Dabipi
(74) *Attorney, Agent, or Firm* — Workman Nydegger (57) ABSTRACT

Representative embodiments disclose mechanisms to create analytic metrics for bots. In one set of embodiments, the system creates a custom URI that encodes bot specific information in a URI format. An analytic record is created based on the URI and the analytic record can be logged and/or sent directly to an analytic platform designed to provide analytic metrics for websites. In this fashion, website analytic platforms can be used to provide analytic metrics for bots. In another set of embodiments, analytic records are created that are logged and/or sent directly to a bot specific analytic platform. Such a platform may help derive bot specific analytic metrics.

20 Claims, 7 Drawing Sheets

(56) References Cited

OTHER PUBLICATIONS

Analytics in Application Insights. Bullwinkle, et al. Feb. 7, 2018. 3 pages.
Debugging Google Analytics measurements, Driessen, Erik. Mar. 7, 2017, 14 pages.
Request and Response JSON Reference, Author unknown, Dec. 8, 2017, 30 pages.
Azure Bot Service; Recognize intents and entities with Luis, Mak, et al. Mar. 27, 2018, 23 pages.
Build Bot working with Authentication (Azure Bot Service), Matsuzaki, Tsuyoshi. Sep. 6, 2016, 10 pages.

* cited by examiner

NETWORK MAPPING AND ANALYTICS FOR BOTS

FIELD

This application relates generally to bots. More specifically, the application relates to network mapping and analytics for bots that interact with users.

BACKGROUND

Bots are becoming a popular mechanism for companies to ease interactions with users. For example, a company can use a bot to guide users through common tasks such as password reset, answer common questions for users, gather information so the user can be handed off to a human, and many other tasks.

Current analytic frameworks for bots can be quite rudimentary when compared to the rich set of analytics that are available to website owners to track how and when users interact with their websites.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Bots can provide an experience that feels less like using a computer and more like interacting with a person, or at least an intelligent robot. They can be used to shift repetitive tasks such as taking a dinner reservation, gathering profile information, answer questions, act as a research source, automate tasks that do not require human intervention, and numerous other tasks. Bots can be configured to take in text, speech, commands (e.g., in some command language), or other input.

Analytic systems, such as Google® Analytics, Microsoft® Azure Analytics, and others help web site owners identify how and when users interact with their websites. They typically help web site owners optimize their content presentation and increase the likelihood that users will have a successful experience on their web site. These analytic platform are quite mature and provide deep insight into such things as website performance, how likely it is that certain goals will occur such as a sale, and show what sequence of events most often lead to the desired goal.

Bot analytics, on the other hand, are often quite rudimentary, with little or no insight gained into either the operation of the bot or how users interact with a particular bot.

Embodiments of this disclosure allow bots to take advantage of the rich website analytic systems such as Google® Analytics, Microsoft® Azure Analytics. The input/output of a bot can be viewed as a state machine where the bot has an existing state and takes certain actions (e.g., transitions to another state) based on some input or interaction with the user. The present invention encodes bot information into a custom Uniform Resource Identifier (URI). The URIs can then be used to create analytic records that match the expected input of the chosen analytic platform. This allows bots to take advantage of the sophisticated analytic platforms that are currently available without having to create custom analytic platforms for bots.

In other embodiments of this disclosure, bot specific information that is not understood by website analytic platforms are created and sent to a bot specific analytic platform. This platform allows the creation of analytics that are unique to bots.

Embodiments of the present disclosure improve the functioning of the machine by allowing bot owners to diagnose how well bots are functioning, how well users are responding to bots, whether bots are achieving their design goals, and so forth. Without the detailed metrics provided by embodiments of this disclosure, such would not be possible. In addition, embodiments improve the efficiency of systems by expanding the applicability of existing analytic platforms to encompass bots, which they are not designed to encompass. This allows bot owners to take advantage of rich analytic platforms that have been unavailable to them. Finally, companies that already use a particular analytic platform do not have to change and/or retool just because they employ bots for certain functions. The bots can utilize the same analytic platform.

Description

Figure 1:
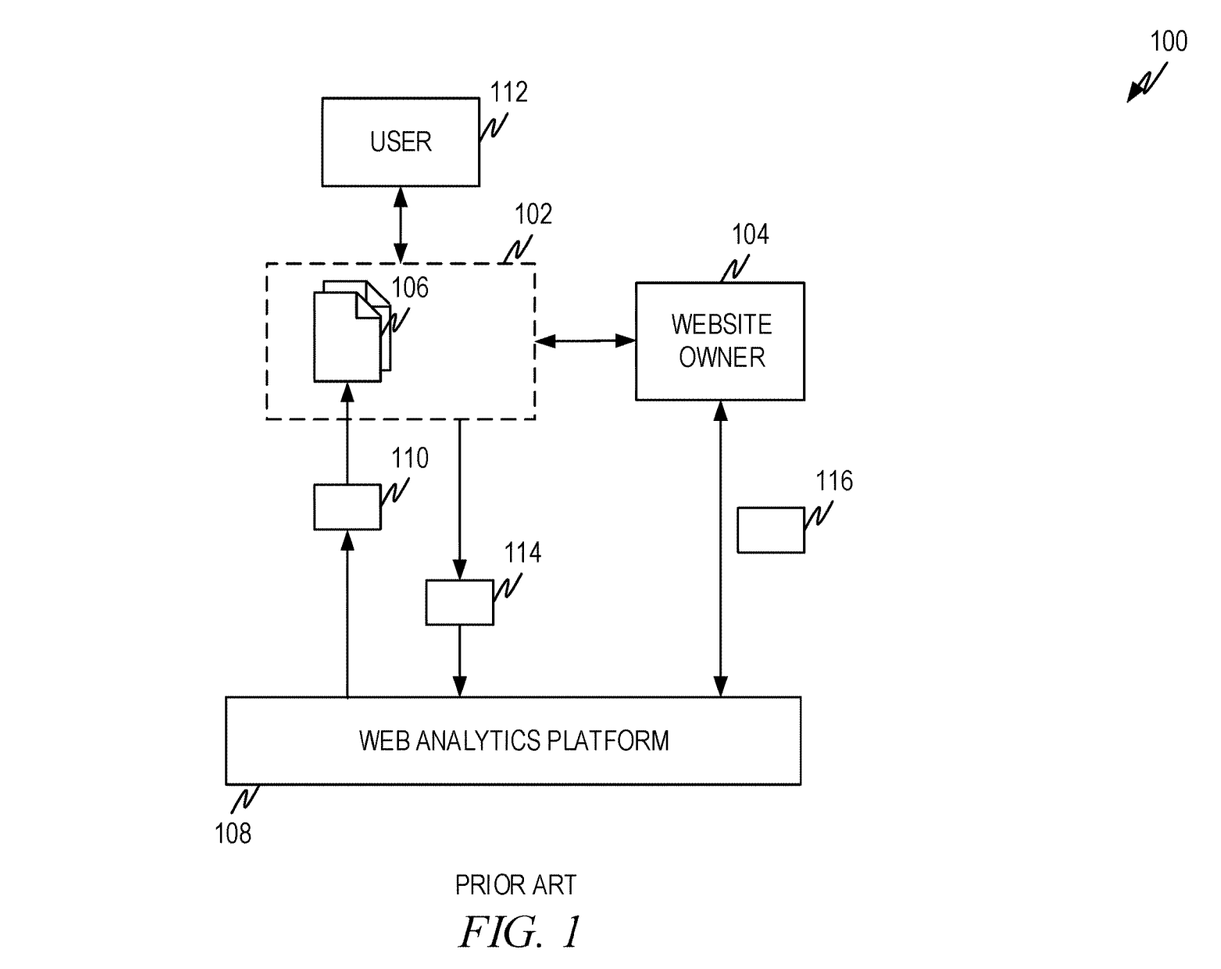
FIG. 1 illustrates an example prior-art architecture for website analytics.

FIG. 1 illustrates an example prior-art architecture for website analytics. The website owner 104 receives instrumentation code 110 from the website analytics platform 108 or from another source. The website owner 104 incorporates this code into each of the web pages 106 that comprise the website 102. The purpose of the instrumentation code 110 is to capture appropriate information as users 112 interact with the various web pages 106 of the website 102.

As users browse pages 106, and otherwise interact with the web pages 106 of the website 102, the instrumentation code 110 captures information and sends the information 114 back to the web analytics platform 108, or to another database or log that is then submitted to the analytics platform at a later date.

The website owner 104 can then interact with the web analytics platform 108 as shown by 116 and extract metrics that allow a website owner 104 to ascertain how and when users 112 with the website 102. It the website owner has a goal, such as completing sales or other transactions, some analytics platform 108 allow the website owner 104 to establish these goals and the analytics platform 108 can help the website owner 104 gather analytics on which aspects of the website tend to lead to accomplishing the goals.

In general, website analytics platforms that are in existence provide rich analytics on websites and allow website owners to see many aspects of how their website is functioning, whether the website is meeting goals for the website, how users interact with the website, and so forth.

In contrast, analytics for bot platforms are quite rudimentary and only allow a bot owner to see such things as how many unique users interact with a bot.

Figure 2:
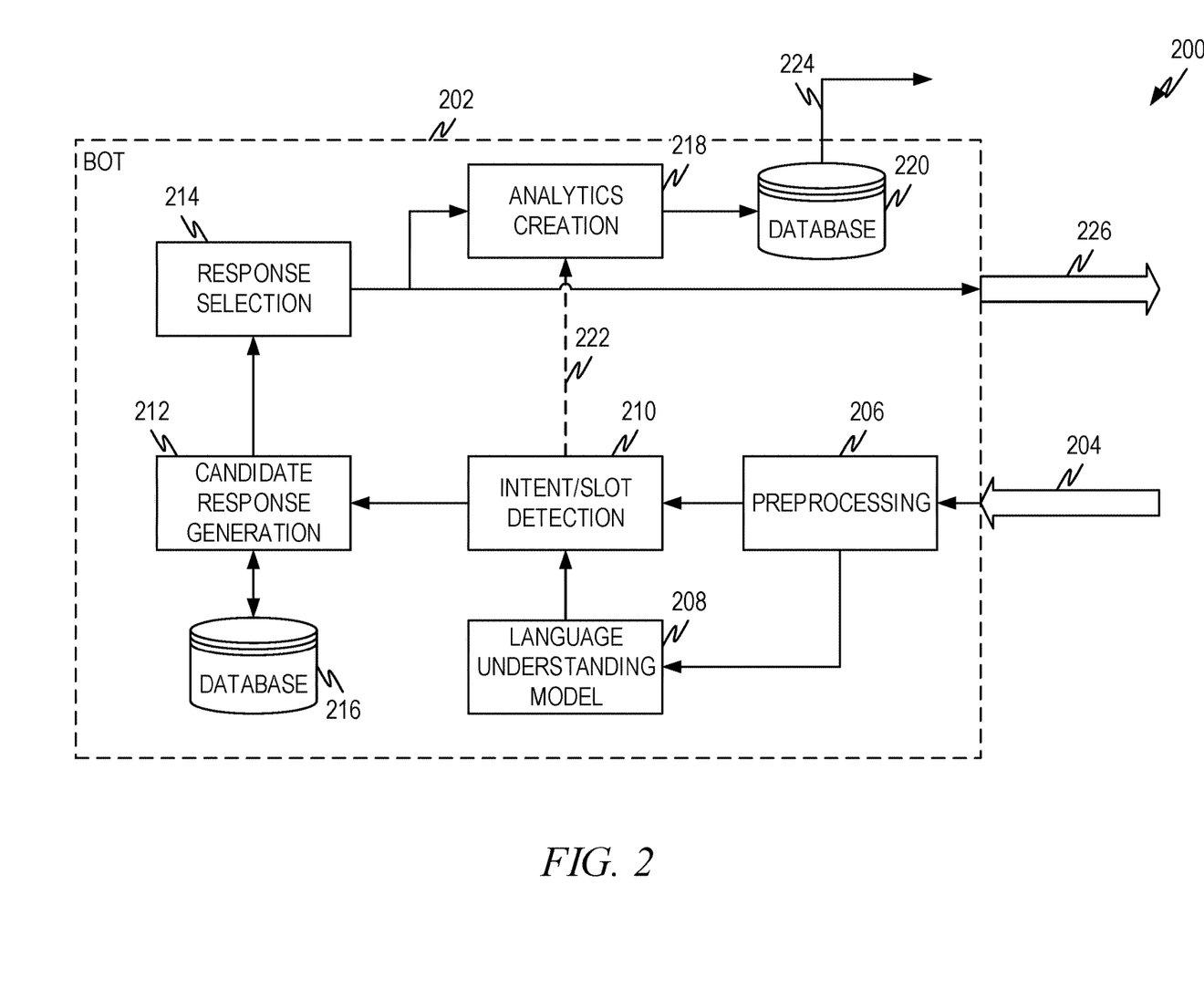
FIG. 2 illustrates a representative bot architecture according to some aspects of the present disclosure.

FIG. 2 illustrates a representative bot architecture 200 according to some aspects of the present disclosure. The bot architecture 200 comprises a plurality of functionality that can be either provided by the bot owner, or can be acquired from services, or a combination of both. Thus, any or all of the functionality of the bot 202 discussed below can be provided by the bot owner, can be acquired from service providers, or any combination thereof.

A bot 202 can be any type of bot and can be designed to fill any type of roll. For example, the bot 202 can be a question and answer bot designed to answer user's questions. As another example the bot 202 can be used to collect information from a user and/or triage a user's needs before handing the user over to another human. As another example, the bot 202 can automate one or more tasks for a user. As yet another example, the bot 202 can be a conversation bot, or any other type of bot.

The bot receives input 204 and produces responses 226 based on the input and/or other information. Thus, a bot engages a user in a sequence of exchanges, which collectively represent a conversation. A "turn" represents a complete round trip within a bot, from a received request to potentially multiple responses. A turn can also be referred to as a conversation step, or step in a conversation.

A dialog can be thought of as a template for a conversation. Thus, candidate responses, response information and so forth are gathered by someone who designs the bot into a "flow" or "dialog" which is the expected flow of a conversation. In point of fact, the actual conversation may deviate from a single anticipated dialog due to specific requests by the user. For example, a dialog may be designed to gather particular information from a user that allows booking of a reservation followed by actual booking of the reservation. A particular conversation, however, may deviate from the dialog after the system gathers the required information and prompts the user "should I complete the booking?" when the user replies "can you remind me what day we are talking about again?". The dialog may have expected the user to reply with "Yes" or "No" and the user actually sidetracks the dialog, at least temporally.

The information sent in a response is referred to herein as a card or as a prompt, which are interchangeable terms that mean the same thing. The information received from a user in a request is referred to as an utterance. Utterances can have many representations, also referred to as formats, such as text, voice, and so forth. Requests and/or responses are generally referred to as messages.

Requests with their associated utterances are received by the bot 202 as indicated by 204. Depending on the bot, the received utterance may be in one of a number of different formats or types. Thus, the bot 202 may receive speech, text, commands in a command language, and/or other formats or types. Depending on the variety of types/formats used, the bot 202 may comprise a preprocessing process 206 that places the received utterance in a common format. For example, speech can be converted to text. Other preprocessing can also be performed to place the input into a format and/or type for further processing by the bot 202. Preprocessing mechanisms are known and one of skill in the art will be able to identify what preprocessing, if any, is appropriate for the received utterances.

After any desired preprocessing 206, the utterance can be sent to a language understanding model 208 and/or intent/slot detection process 210. The purpose of these processes is to detect the intent and/or any slot information contained in the received utterance. Intent is what the user intends in the utterance. A slot is information related to the intent. A slot is sometimes referred to as an entity. For example, if the utterance is "order me a pizza" the intent is to order goods or services. The slot is "pizza" which is what the user wants to order. As another example, if the utterance is "play the latest King Arthur trailer" the intent is to view media. Slots are "trailer" which is the particular type of media the user desires to view and "King Arthur" which is the particular trailer the user desires to view. While there is generally only one intent associated with an utterance, there can be one or more slots associated with an utterance.

Slots can be express, such as those in the examples above, or can be implied. Thus, an utterance such as "tell John about the 2:00 pm meeting" has an intent, which is to inform someone of something. The slots are "John," which represents the recipient of the information and "the 2:00 pm meeting" which is the information that should be conveyed. However, the information by itself may be insufficient to effectuate the user's intent as the bot has to further understand how to contact John and what the details are of the 2:00 pm meeting that should be included in the communication. This information may need to be retrieved from further sources such as the user's contact list and calendar to fully identify the slots of the utterance.

Intent/slot detection 210 can be part of a language understanding model 208 or can be separate. Mechanisms for intent/slot detection 201 and/or language understanding 208 are known and any such mechanisms can be used with embodiments of the present disclosure.

Intent and/or slots can be combined with other information, e.g., from database 216 to produce a set of candidate responses by candidate response generation mechanism 212. Often, depending on where the user is in a dialog and what the received intent/slot(s) are, there can be multiple ways that the bot can respond. The candidate response generation process 212 selects candidate responses that are later ranked so that one or more appropriate responses can be selected, e.g., by response selection process 214 so they can be returned to the user as shown by 226.

A response that is selected by response selection process 214 has one or more parameters associated with the response, the conversation, the context, the user, and/or so forth. These parameters can fall into several broad categories, depending on whether the particular item is a request, a response, and so forth. For example, the parameters can fall into the categories of:

one or more parameters associated with a received bot message (e.g., request);
one or more parameters associated with a reply bot message;
one or more parameters associated with intent and/or slot detection;
one or more parameters associated with a language understanding model; and/or
one or more other parameters associated with the context of the messages and/or the bot itself.

Representative examples of parameters include, but are not limited to:

Bot owner: identifies the owner of the bot such as a company name or other identifier.
Bot: identifies the bot itself.
Dialog: identifies a dialog being used in a conversation.
Prompt: identifies a prompt in a reply or request. This can be information sent in a reply or request, the name of a card that is sent in a reply, and so forth.
Utterance: the text/content of an utterance received in a request or the representation of an utterance.
Session: identifies the user session. May include one or more conversations.
Message: identifies the particular message (reply and/or request) to distinguish it from other messages. Also referred to as activity (identifier, name, type, etc.).
Channel: identifies a channel used to send messages to and/or receive messages from a user. Examples can include messaging services, digital assistants, programs, applications, and so forth that can serve as a channel.
Origin: previous state of the bot. State includes at least a portion the prior parameters of the bot.
User: identifies the user.
User Information: Information associated with a user such as demographic information, profile information, location information, and so forth.
Conversation: identifies the conversation.
Intent: identifies the intent.
Intent Score: confidence level or score associated with the intent.
Slot: identifies the slot(s).
Slot score(s): confidence level or score associated with the score(s).
Sentiment: Identifies one or more sentiment of the message. Sentiment describes how a user feels or what a user is experiencing, such as an emotion (angry, sad, satisfied, happy, and so forth).
Sentiment score: confidence level or score associated with the sentiment(s).
Moderator: identifies a moderator.
Moderator Comment: identifies content moderator results such as flagged, prohibited, safe, and so forth.
Tenant: identifies the tenant for bots that are multi-tenanted.
Question: identifies the question that was answered in a question/answer bot.
Original question: identifies the question originally asked by a user.
Answer: the answer given to the user (can be "Prompt" above)
Answer score: confidence level or score associated with the answer.

Any combination of the above parameters in any combination of forms and/or types can be used.

The parameters above can take any desired form. For example, a parameter can be a textual string, an identifier, a number, an alpha numeric string, and so forth. The parameters can also have multiple forms and/or multiple parameters. These fall into three main categories, such as an identifier, a name, and a type. For example, Activity may include one or more of an ActivityID, an ActivityName, and/or an ActivityType in any combination. As another example, a system may use a user identifier in the form of a GUID (globally unique ID) as well as a user name in the form of a text string.

The following represent some of the information that can be logged for various dialogs, messages received and/or sent, from the language understanding model (208) and/or intent/slot detection (210) and so forth. The parameters listed for each item are an example only, and either more or fewer parameters can be logged, such as the parameters listed above in any combination. All of these can be identifiers, names, types, and/or any combination thereof as discussed previously.

When a dialog is started:
User
Session
Message and/or Activity
Channel
Dialog
Dialog Instance and/or Conversation Instance (specific instance of the dialog or conversation)
At a step of a dialog and/or conversation:
User
Session
Message and/or Activity
Channel
Dialog
Dialog Instance and/or Conversation Instance (specific instance of the dialog or conversation)
At cancellation of a dialog:
User
Session
Message and/or Activity
Channel
Dialog
Dialog Instance and/or Conversation Instance (specific instance of the dialog or conversation)
Dialog Step (current step of the dialog when abandoned or cancelled).

When a message is received, sent, or information from the language understanding model and/or intent/slot detection is logged, the following can also be logged in addition to, or in lieu of, the dialog logging above. All of these can be identifiers, names, types, and/or any combination thereof as discussed previously (e.g., Conversation can be a ConversationID, a ConversationName, ConversationType, or any combination thereof).

When a message is received for a bot:
User
Conversation
Message and/or Activity
Channel
Text (utterance of the message received)
From (where the message is received from)
Recipient (where the message is directed to)
Locale and/or other user information When a message is sent by a bot:
User
Conversation
Message and/or Activity
Channel
Reply content (identifies content that was sent or contains the content that was sent)
From (where the message is sent from)
Recipient (where the message is directed to)
Locale and/or other user information
From the language understanding model and/or intent/slot detection:
User
Conversation
Message and/or Activity
Channel
Intent
Intent Score (confidence score associated with the intent)
Slot(s)
Slot Score(s) (confidence score associated with the slot)
Question (question identified from the input utterance)
Sentiment
Sentiment Score (confidence score associated with the sentiment)
Dialog
When a question and answer type query/message is identified:
User
Conversation
Message and/or Activity
Channel
Original Question (question submitted by the user)
Question Answered (question that was actually answered)
Answer
Score (confidence score associated with the answer)

Analytics creation process 218 creates an analytic record, a URI, and/or other information as described herein. The created information can be stored in a database 220 for later analysis and/or passed directly or indirectly to an analytic system 224.

The response is sent back to the user through a communication channel as indicated by 226.

Figure 3:
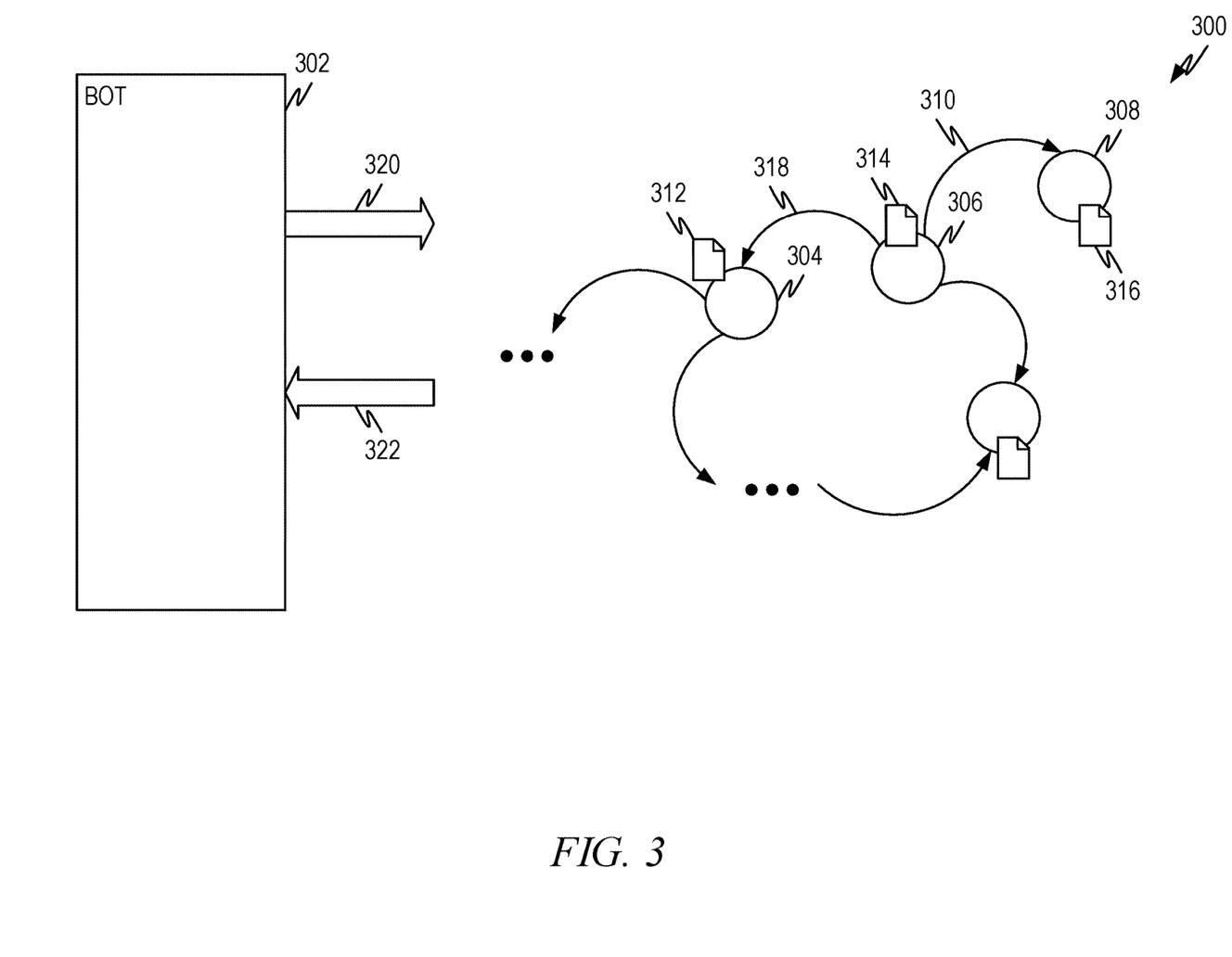
FIG. 3 illustrates a representative example network created by interaction with a bot according to some aspects of the present disclosure.

FIG. 3 illustrates a representative example network 300 created by interaction with a bot according to some aspects of the present disclosure. At a high level, the bot 302 receives information 322 and, based on that information as well as other information formulates one or more responses 320. Thus, the sequence of a conversation can be viewed as a network map, with each node representing a current state of the conversation and moving from one node to another based on user or other input.

As an example, consider that the node 306 represents the current (or source) node of a conversation. The parameters, including whatever prompt is sent to the user is represented by 314. Based on the user response and/or other information (310, 318), the bot will move to either destination node 304, displaying a prompt and having parameters 312 or move to destination node 308, with its associated prompt/parameters 316. The destination node becomes the new source node and the process repeats for the duration of the conversation. Over time, as the conversation proceeds, a network map with each node in the map having a set of parameters will be built up. As indicated in FIG. 2, at each node, an analytic record is created. Thus, the network map can be used as a model to collect information on the bot from which analytics can be derived. As indicated below, the analytic records can be based on a URI encoding scheme or can be custom records for a bot specific analytic system.

Figure 4:
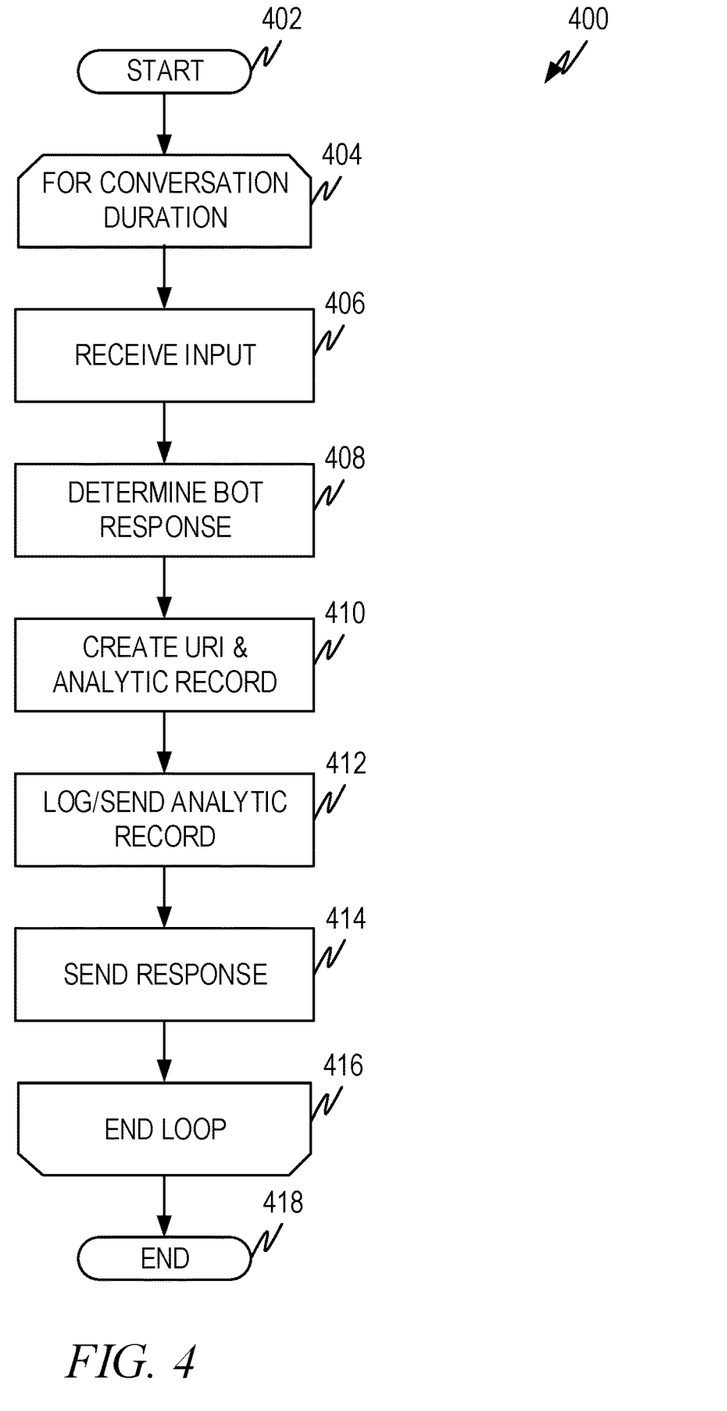
FIG. 4 illustrates a representative flow diagram for creating a bot analytic record for according to some aspects of the present disclosure.

FIG. 4 illustrates a representative flow diagram 400 for creating a bot analytic record for according to some aspects of the present disclosure. This flow diagram can represent an example of how analytics creation process 218 can operate. In this embodiment, the analytic records created are based around a custom URI that encodes some or all of the parameters for a conversation step.

The flow diagram starts at 402 and continues to operation 404 that opens a loop for the duration of the conversation. Although not specifically shown, the system can create an analytic record when the process first starts, such as, for example, when the bot initiates a new conversation and can include any initial prompt that is sent to the user.

Operation 406 represents input received that moves the conversation forward, such as a user responding to an initial or previous prompt. This input can be preprocessed, sent to a language understanding model, and the intent and slot(s) determined as described in conjunction with FIG. 2.

In operation 408 the bot determines what response prompt will be sent during the next step of the conversation. This can be accomplished as described in FIG. 2.

In operation 410, a custom URI, which encodes some or all of associated parameters, is created as described below. The URI can be used to create an analytic record as described below.

In operation 412, the analytic record is logged, such as in a database or file, and/or sent to the analytic platform. Because the analytic record is based on a custom URI, the analytic record can be sent to a web analytic platform in order to use the web analytic platform to produce rich metrics on a bot.

In operation 414 the response is sent to the user using a communication channel. Operation 416 closes the loop for the conversation and the process ends at operation 418 when the conversation is finished, closed by the user, and/or otherwise terminated.

Figure 5:
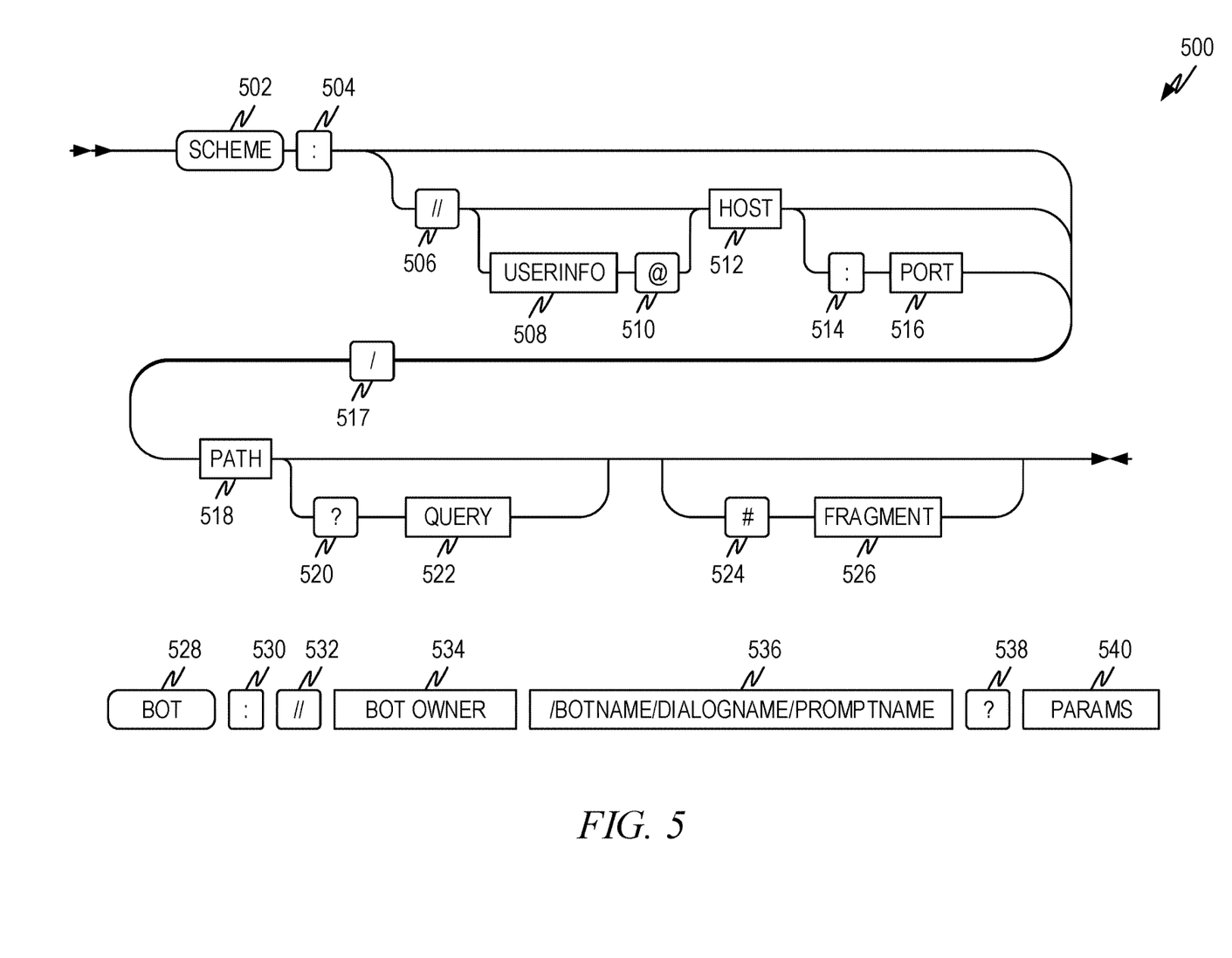
FIG. 5 illustrates a representative example for creating a custom URI for a bot analytic record according to some aspects of the present disclosure.

FIG. 5 illustrates a representative example 500 for creating a custom URI for a bot analytic record according to some aspects of the present disclosure. Although the description describes embodiments that use a custom URI, embodiments of the present disclosures can use Internationalized Resource Identifiers (IRI) or other identifiers that can be consumed by a web analytic platform. URI is simply a chosen representative example.

The syntax diagram in FIG. 5 shows the syntax of a URI and also shows a representative example of how the syntax can be used to encode parameters into a custom URI. The accompanying text specify other representative examples.

As noted herein, web analytic platforms generally track how and when a user interacts with a website. Additionally, some web analytic platforms allow users to set goals for events like completed transactions and so forth and track how users reach a successful conclusion for these goals. For example, if a goal is to complete a transaction, as indicated by a certain sequence of events on a website, the analytic platform usually allows a website owner to identify not only the number of completed transactions, but how a user interacted with the website to reach that conclusion, such as which web pages were visited, which links were clicked, dwell time for pages, and so forth.

By encoding of bot parameters into URIs, similar things can be tracked for a bot. For example, if a goal is to answer a user's questions, as evidenced by a user asking a question, the bot presenting a card with information, and having the user indicate that was what they were looking for. Thus, when these conversation events are encoded into appropriate URIs, the sequence of events can be related to a goal in the analytic system and analytics collected on how often the goal was achieved, what cards lead to a successful completion, and so forth.

In a URI, a non-empty scheme 502 is followed by a colon 504. Encoding the scheme with an identifier that allows the bot owner to identify that the URI relates to a bot is a good practice. This allows a bot owner to separate out bot analytics from other web analytics that may be collected by the same web analytic platform. In a representative example, "bot" is used as the scheme as shown in 528, followed by the colon 530.

An optional authority component follows the colon 504 and is proceeded by two slashes 506. After the slashes 506, an optional userinfo subcomponent may consist of a user name and an optional password proceeded by a colon and followed by an at symbol 510. In one representative example, the userinfo subcomponent is not used for encoding bot parameters. In other examples, the userinfo subcomponent can be used.

The host portion of the URI 512 can be used to encode the bot owner of the bot at issue. Thus, in the representative example, the colon 530 is followed by two slashes 532 and the bot owner 534. The bot owner can be the company or individual that controls the bot. Thus, if a bot is controlled by a company called Contoso Ltd., the bot owner parameter can be "contoso.com" or something equivalent. Other information, instead of, or in addition to, the bot owner, can be encoded in this section of the URI.

After the host, an optional colon 514 and port 516 can exist in the URI. In some embodiments the port 516 is not used, while in other embodiments the port 516 can be used to encode a parameter for the bot.

Following the bot owner 534, the path 518 can be used to encode parameters such as the bot name, the dialog name, and the prompt name. Thus, in the representative example, the path 536 has a format of "bot name/dialog name/prompt name". As noted above bot name identifies a bot from other bots a bot owner may have. Dialog name identifies a dialog being used in a conversation. Prompt name identifies a prompt that is displayed to a user. For example, if the bot name is "combot," the dialog name is "diagnostic_dialog" and the prompt is the initial greeting, the parameters may be encoded like "combot/diagnostic_dialog/greetingPrompt". One or more of these parameters can be optional.

As an alternative to the above encoding, one or more of the parameters that are part of the path 536 can be encoded as part of the bot owner 534. For example, if the owner is Contoso Ltd. and the bot name is "timeCardBot2" then the bot name and company name can be encoded as part of 534 as "timeCardBot2.contoso.com".

In general, parameters that do not vary much from instance to instance, parameters that do not change much, and/or parameters that represent items that are reused from user to user, conversation to conversation, and/or so forth, can be encoded in the first part of the URI as part of the host 512 and/or path 518. Parameters that change more often, parameters that vary from instance to instance, and so forth can be encoded as part of the query 522 and/or fragment 526 as described below.

After the path 518, the URI has an optional query parameter. This comprises a question mark 520 followed by a query string 522. The syntax of the query is not well defined, although many use the convention of attribute-value pairs separated by a delimiter, such as tag=networking& order=newest. The lack of a rigorous syntax combined with the flexible nature of the query 522 make this a good parameter to encode utterances and/or other parameters that vary from instance to instance to the extent the bot owner wishes them to be captured. Thus, if a user types "tell me about the print API" into a bot, the utterance can be captured by emitting the question mark 538 and the utterance 540 as ?response="tell me about the print API". Any attribute name can be used in the place of "response" such as "utterance" or any other identifier that is used to identify that what comes next is the text of the utterance. As another example, the origin (or source) can be encoded in the query 522 such as by using a message identifier or activity identifier.

Any of the parameters described herein may be similarly encoded as attribute-value pairs. For example, any of the parameters described above can be encoded as an "attribute" and the value of the parameter can be encoded as the "value" portion of the attribute value pair. As representative examples:

Message: message=123456789
Channel: channel=FaceBook
User: user=User3
User Information: userLocation="Los Angeles"&userGroup=5&username=JSmith
Conversation: conversation=AFX123
Intent: intent=order
Intent Score: intentScore=78
Slot: slot="pizza"&slot="soda"
Slot score(s): slotScore=98&slotScore=34
Sentiment: sentiment=confused
Sentiment score: sentimentScore=76
Question: question="height of Mount Everest"
Original question: originalQuestion="height of Everest"
Answer: answer="8,848 m"

Following the path and/or query is an optional fragment 526 proceeded by a hash mark 524. In a URI this typically identifies a direction to a secondary resource, such as a section heading in a document identified by the remainder of the URI, or the ID of a specific element of an HTML page. In the case of the ID of a specific element of an HTML page, browsers will use the fragment to scroll to that element when the page is displayed. Some embodiments do not use the fragment 526. Other embodiments can encode parameters in the fragment section 526.

As a representative example of how URIs can be encoded, consider the following sequence of exchanges between the bot "infoBot", owned by Contoso Software, and a user, "User3".

User3 launches the bot and the following sequence results:

infoBot: "Welcome, User3, I am infoBot. How can I help you?"
User3: "What parameters does the StoreValue API have?"
infoBot: "Here's the StoreValue API: . . . "
User3: "Just what I needed. Thanks!"
infoBot: "No problem."
This conversation can be encoded as:
bot://ContosoSoftware.com/infoBot/QnA/greetingPrompt
bot://ContosoSoftware.com/infoBot/QnA/greetingPrompt?utterance="What parameters does the StoreValue API have?"
bot://ContosoSoftware.com/infoBot/QnA/StoreValuePrompt
bot://ContosoSoftware.com/infoBot/QnA/StoreValuePrompt?utterance="Just what I needed. Thanks!"

bot://ContosoSoftware.com/infoBot/QnA/CloseConversationPrompt

Other parameters can also be encoded in the URIs. For example, if the bot owner wishes to capture intent and slot detection parameter information, those can be encoded as attribute-value pairs as part of the "query" URI portion (e.g., 522). For example, representative attribute-value pairs could be "intent=question&slot=StoreValueAPI". Any other parameters can be similarly encoded as appropriate attribute-value pairs.

These custom URIs (e.g., the URIs encoding the bot parameters) can be used to create appropriate analytic records that can be consumed by the desired web analytic platform. As noted above, each web analytic platform will have a piece of analytic code that is injected into each web page of a website owner's website. The analytic code will capture information when a user interacts with the website and will produce the corresponding analytic record for the platform. Creating the appropriate analytic record can be accomplished by mimicking what the analytic code does as if the analytic code had been injected to a web page described by the custom URI created using the process described above. Thus, the output analytic record will be a record that, although produced by the bot, will be created as if a web page defined by the custom URI had produced the analytic record based on the user's interactions.

Encoding bot parameters in this way allows rich analytics to be obtained for bots without creating separate bot analytic platforms.

Figure 6:
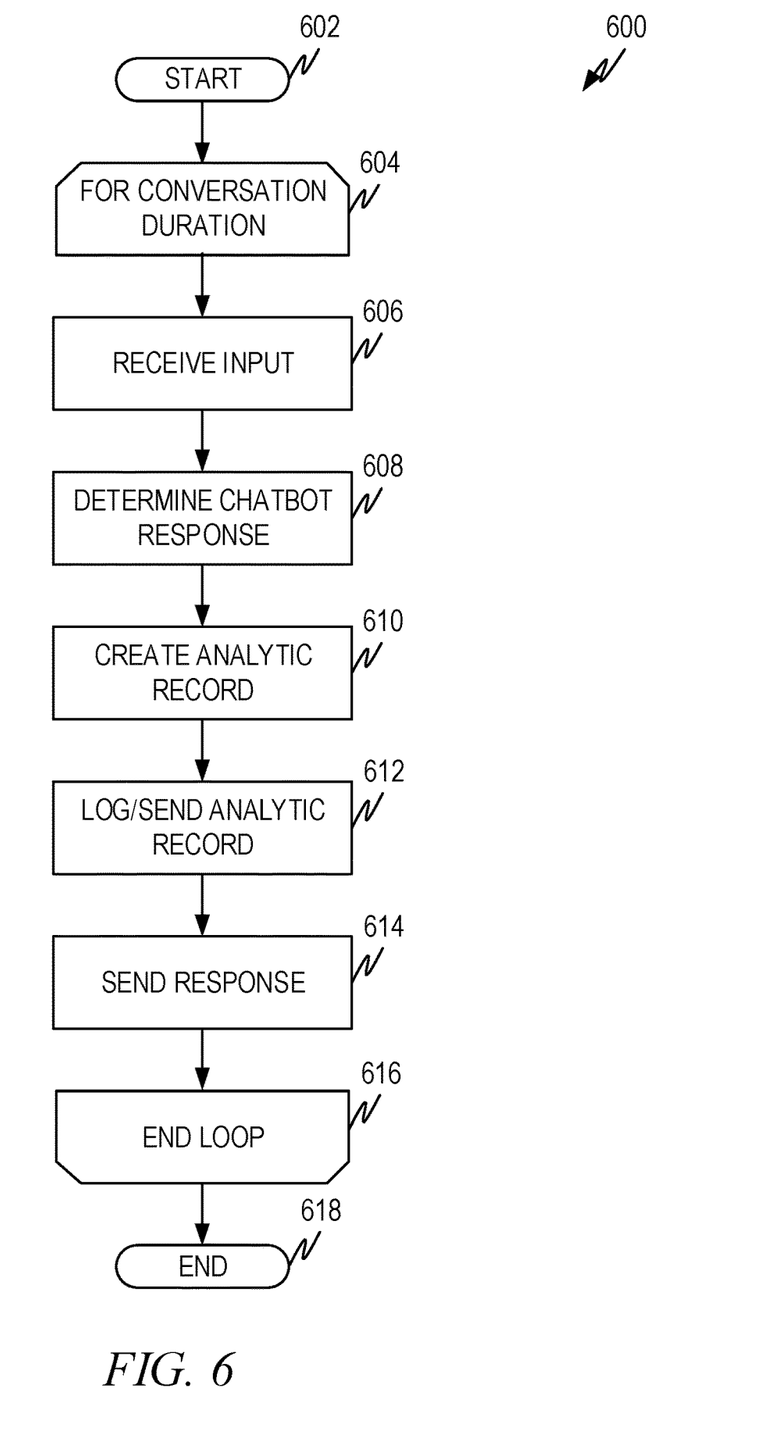
FIG. 6 illustrates a representative flow diagram for creating a bot analytic record for according to some aspects of the present disclosure.

FIG. 6 illustrates a representative flow diagram 600 for creating a bot analytic record for according to some aspects of the present disclosure. This flow diagram can represent an example of how analytics creation process 218 can operate. In this embodiment, the analytic records created are for a bot specific analytic platform.

The flow diagram starts at 602 and continues to operation 604 that opens a loop for the duration of the conversation. Although not specifically shown, the system can create an analytic record when the process first starts, such as, for example, when the bot initiates a new conversation and can include any initial prompt that is sent to the user.

Operation 606 represents input received that moves the conversation forward, such as a user responding to an initial or previous prompt. This input can be preprocessed, sent to a language understanding model, and the intent and slot(s) determined as described in conjunction with FIG. 2.

In operation 608 the bot determines what response prompt will be sent during the next step of the conversation. This can be accomplished as described in FIG. 2.

In operation 610, the analytic record, which captures some or all of associated parameters, is created, as described in this disclosure. In this situation, the analytic record need not be created based on a URI as described in conjunction with FIG. 4 above. The analytic record can be any format that is consumable by the bot specific analytic system.

In operation 612, the analytic record is logged, such as in a database or file, and/or sent to the analytic platform. Because the analytic record is based on a custom URI, the analytic record can be sent to a web analytic platform in order to use the web analytic platform to produce rich metrics on a bot.

In operation 614 the response is sent to the user using a communication channel. Operation 616 doses the loop for the conversation and the process ends at operation 618 when the conversation is finished, closed by the user, and/or otherwise terminated.

There are certain analytics that can be collected on bots that are unique to bots, rather than websites. For example, it is difficult for a user to convey sentiment when clicking links on a website. However, with utterance made by the user, sentiment can be ascertained from the word choice of the user. Thus, analytics tailored to bots may be better able to gather analytics on things that relate to bots, but not necessarily to web sites.

For example, if a dialog has been designed such that users quickly become frustrated, specific analytic may allow a bot owner to modify or tune the dialog to reduce user frustration if such can be uncovered by bot analytics. The tables below identifies some analytics that can be available through web site analytics, bot specific analytics, or both and a representative way the analytics can be calculated. These represent example analytics and do not represent an exhaustive list.

In the following any of the metrics can be aggregation along a desired dimension, if desired. This means that the input data can be gathered on a per dimension basis. For example, if the metric is the number of active users, the number of active users can be aggregated along any dimension, such as a geographic location of the users. Thus, dimension refers to one of the logged parameters, such as any of those described above.

Additionally, or alternatively, some metrics state that they can be subject to a threshold or ordered in a certain way (high to low or low to high). This can be useful when a user desires to only see metrics that transgress the threshold (e.g., exceed or fall below) and/or are at the high or low end of the metric range. Any of the metrics in the tables can be so ordered or subject to a threshold.

Finally, metrics can require aggregation, counting, and/or other statistical measures. Aggregation means to add or accumulate values, possibly along a dimension. Thus, Aggregate conversationID by userID means to aggregate the conversationID for each different userID, so that the aggregation of conversationID is by UserID. Counting is self-explanatory. Statistical measures are well known and need not be further discussed. Statistical measures can be calculated with regard to any of the metrics below.

TABLE 1

Usage Metrics

| Metric | Type | Description |
| --- | --- | --- |
| Number of users who have enabled or registered for bot | User Activity | Count users that complete enabling/registration dialog |
| Number of active users | User Activity | Count of unique messages received for UserIDs |
| Number of anonymous users | User Activity | Count of unique messages received for UserID minus registered users |
| Number of new users who have enabled or registered for bot | User Activity | Count users that complete enabling/registration dialog since given date |
| Average number of sessions per user | Engagement | Aggregate conversationID by userID and calculate averages |
| Average time spent per session | Engagement | Aggregate time by userID and/or conversationID and calculate averages |
| Average number of skills per person | Engagement | Aggregate dialogs (represents skills accessed) by userID and calculate averages |
| Average number of interactions per user | Engagement | Aggregate messages by userID and calculate averages |
| Number of skills per region/language/etc. | Engagement | Aggregate dialogs (represents skills accessed) by desired dimension and calculate averages |

TABLE 1-continued

Usage Metrics

| Metric | Type | Description |
| --- | --- | --- |
| Number of abandoned/cancelled skills (last N sessions) | Churn | Aggregate abandoned dialogs and/or cancel events during conversation by desired dimension for desired time frame |
| Common (high frequency) abandoned/cancelled skills | Churn | Aggregate abandoned dialogs and/or cancel events during conversation by dialog for desired time frame and compare to threshold or list by value highest first |
| Skills with high interaction count | Churn | Aggregate message count by dialog and compare to threshold or list by highest value first |

TABLE 2

Conversational Metrics

| Metric | Type | Description |
| --- | --- | --- |
| Most/least popular skills | Skills insight | Aggregate userID that engage in a dialog and sort by high/low and/or threshold. |
| Skills that take a long time to complete | Skills insight | Aggregate dialog time by desired dimension and sort high to low and/or threshold |
| Average number of interactions per skill | Skills insight | Aggregate number of messages and/or turns for each (or selected) dialog(s) |
| Duration of each stage | Skills insight | Aggregate time for each turn in each/selected dialog(s) for desired dimensions and calculate statistics as desired. |
| Skills that take high interactions | Skills insight | Aggregate number of messages and/or turns for each (or selected) dialog(s) and sort high to low and/or threshold |
| Count user ok with interactions | Skills insight | Aggregate sentiment and/or dialog completion by userID |
| Missed/retried utterance | Skills insight | Aggregate repeat requests (one after the other) with different utterances and/or different intent possibly combined with sentiment |
| Skill transferred to Agent | Skills insight | Aggregate completed dialogs that transfer to agent |
| Number of times skill completed/cancelled/ abandoned | Skills insight | Aggregate dialogs (represents skills accessed) by desired dimension and calculate averages |
| Cancel/abandoned: duration | Skills insight | Aggregate abandoned dialogs and/or cancel events during conversation and correlate to duration of dialog |
| Cancel/abandoned: too many messages | Skills insight | Aggregate abandoned dialogs and/or cancel events during conversation and correlate to number of messages |
| Cancel/abandoned: retry | Skills insight | Aggregate abandoned dialogs and/or cancel events during conversation and correlate to number of retries |
| Cancel/abandoned: not happy | Skills insight | Aggregate abandoned dialogs and/or cancel events during conversation and correlate to sentiment |

Example Machine Architecture and Machine-Readable Medium

Figure 7:
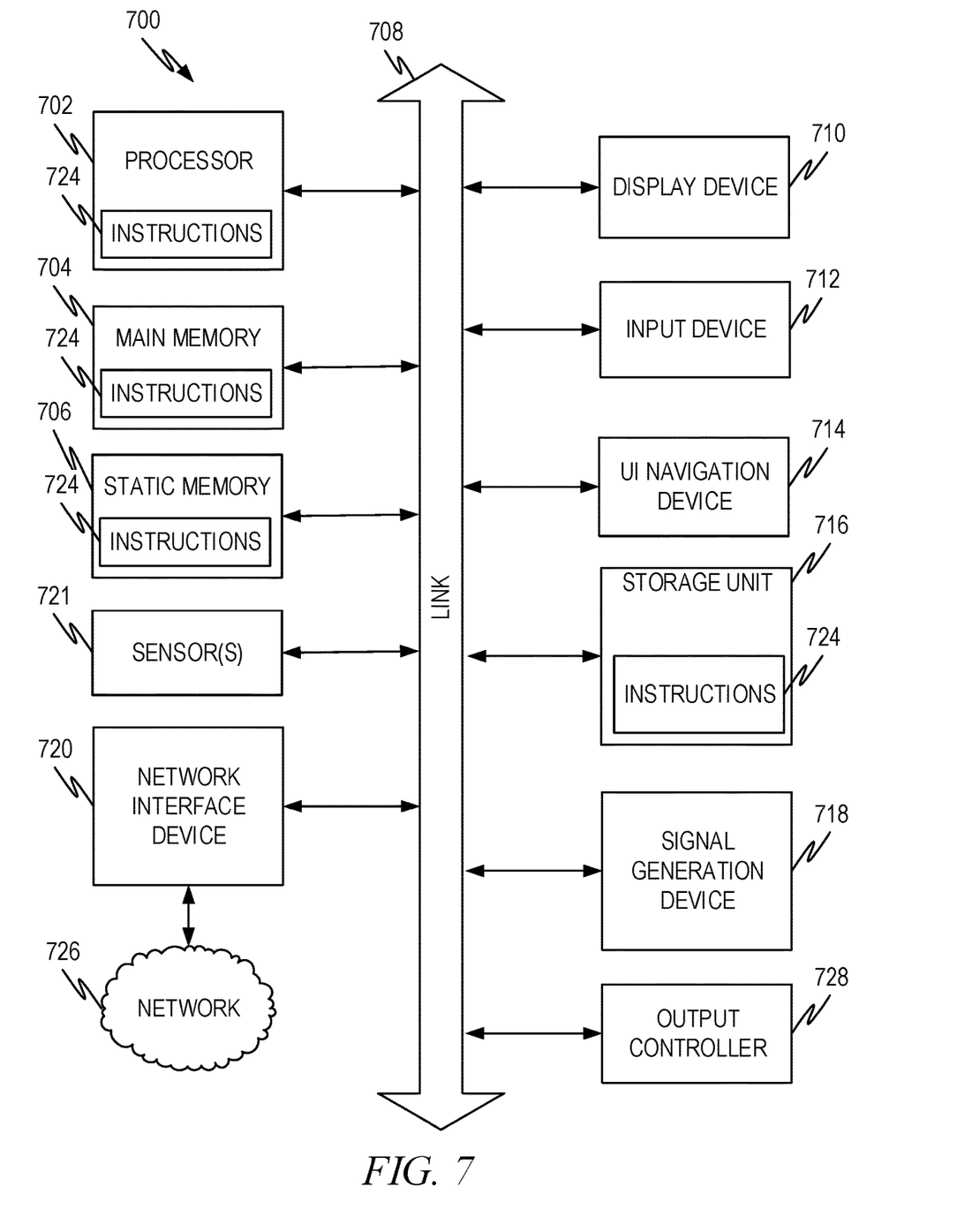
FIG. 7 illustrates a representative machine architecture suitable for implementing the systems and other aspects disclosed herein or for executing the methods disclosed herein.

FIG. 7 illustrates a representative machine architecture suitable for implementing the systems and other aspects disclosed herein or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), an eye tracking subsystem, and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, communication mechanisms, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method for instrumenting bots, comprising:
receiving a plurality of parameters associated with a conversation step between a bot and a user;
encoding the parameters within a custom Uniform Resource Identifier (URI);
creating an analytic record comprising the custom URI;
submitting the analytic record to an analytic system in order to derive analytics based on the conversation step.

Example 2

The method of example 1 wherein the parameters comprise at least one of:
a bot owner;
a bot identifier;
a tenant identifier; and
a dialog identifier.

Example 3

The method of example 1 or 2 wherein the parameters further comprises one or more of:
a prompt name;
a message identifier; and
an origin.

Example 4

The method of example 1, 2, or 3 wherein the parameters further comprise a conversation identifier.

Example 5

The method of example 1, 2, 3, or 4 wherein the parameters further comprise a session identifier.

Example 6

The method of example 1, 2, 3, 4, or 5 wherein the parameters further comprise an utterance or representation of an utterance.

Example 7

The method of example 1, 2, 3, 4, 5 or 6 wherein the URI takes the form of:
bot://[list1]/[list2], where:
[list1] is one or more of the plurality of parameters including a parameter describing the owner of the bot; and
[list2] is one or more other of the plurality of parameters, where multiple parameters are separated by a '/' character.

Example 8

The method of example 7 wherein the URI takes the form of:
bot://[list1]/[list2]?[list3], where
[list3] is one or more parameters not in [list1] or [list2] and wherein the one or more parameters in [list3] have the form of [parameter identifier]=[value], where [parameter identifier] is an identifier of the parameter and [value] is the value of the parameter having the identifier.

Example 9

The method of example 1, 2, 3, 4, 5, 6, 7, or 8 wherein the parameters comprise one or more of:
sentiment parameters; and
content moderator parameters.

Example 10

The method of example 1, 2, 3, 4, 5, 6, 7, 8, or 9 wherein the parameters comprise at least one of:
a bot activity identifier;
a bot activity type;
a bot activity channel identifier.

Example 11

A system comprising:
a processor coupled to memory storing executable instructions, which when executed by the processor cause the processor to perform operations comprising:
receiving a plurality of parameters associated with a conversation step between a bot and a user, the parameters associated with the conversation step comprising one or more of:
one or more parameters associated with a bot message received;
one or more parameters associated with a bot message send;

one or more parameters associated with intent and/or slot detection; and one or more parameters associated with a language understanding model;

creating an analytic record comprising the one or more parameters associated with a conversation step;

submitting the analytic record to an analytic system in order to derive analytics based on the conversation step.

Example 12

The system of example 11 wherein the parameters associated with the conversation step comprise at least one of:
a bot owner;
a bot identifier;
a tenant identifier; and
a dialog identifier.

Example 13

The system of example 11 or 12 wherein the parameters associated with the conversation step comprises one or more of:
a prompt name
a message identifier; and
an origin.

Example 14

The system of example 11, 12, or 13 wherein the parameters associated with the conversation step comprise a conversation identifier.

Example 15

The system of example 11, 12, 13 or 14 wherein the parameters associated with the conversation step comprise a session identifier.

Example 16

The system of example 11, 12, 13, 14, or 15 further comprising encoding the parameters associated with the conversation into a custom URI.

Example 17

The system of example 16 wherein the URI takes the form of:
bot://[list1]/[list2], where:
[list1] is one or more of the plurality of parameters associated with the conversation including a parameter describing the owner of the bot; and
[list2] is one or more other of the plurality of parameters associated with the conversation, where multiple parameters are separated by a '/' character.

Example 18

The system of example 17 wherein the analytic system is an analytic system tailored to compiling analytics for web sites.

Example 19

The system of example 11, 12, 13, 14, 15, 16, 17, or 18 wherein the parameters associated with the conversation step comprise one or more sentiment parameters.

Example 20

A computer storage medium comprising executable instructions that, when executed by a processor of a machine, cause the machine to perform acts comprising:
receiving a plurality of parameters associated with a conversation step between a bot and a user, the plurality of parameters comprising one or more of:
one or more parameters associated with a bot message received;
one or more parameters associated with a bot message send;
one or more parameters associated with intent and/or slot detection; and
one or more parameters associated with a language understanding model;
encoding the parameters within a custom Uniform Resource Identifier (URI);
creating an analytic record comprising the custom URI;
submitting the analytic record to an analytic system in order to derive analytics based on the conversation step.

Conclusion

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:
1. A computer implemented method for instrumenting bots, comprising:
conducting a conversation between a bot and a user at a node, the conversation comprising a plurality of messages exchanged between the bot and the user at the node;
for each of the plurality of messages,
identifying a plurality of parameters associated with the message between the bot and the user associated with an interaction between the bot and the user; and
encoding the plurality of parameters of the message associated with the interaction between the bot and the user directly into a custom Uniform Resource Identifier (URI) based on a path syntax;
creating an analytic record for the node comprising a plurality of custom URIs, each of which is associated with one of the plurality of messages in the conversation; and
submitting the analytic record to an analytic system in order to derive analytics related to the conversation.
2. The method of claim 1 wherein the parameters comprise at least one of:
a bot owner;
a bot identifier;
a tenant identifier; and
a dialog identifier.

3. The method of claim 1 wherein the parameters further comprises one or more of:
a prompt name;
a message identifier; and
an origin.

4. The method of claim 1 wherein the parameters further comprise a conversation identifier.

5. The method of claim 1 wherein the parameters further comprise a session identifier.

6. The method of claim 1 wherein the parameters further comprise an utterance or representation of an utterance.

7. The method of claim 1 wherein the URI takes a form of:
bot://[list1]/[list2], where:
[list1] is one or more of the plurality of parameters including a parameter describing an owner of the bot; and
[list2] is one or more other of the plurality of parameters, where multiple parameters are separated by a '/' character.

8. The method of claim 1 wherein the analytic system is an analytic system tailored to compiling analytics for web sites.

9. The method of claim 1 wherein the parameters comprise one or more of:
sentiment parameters; and
content moderator parameters.

10. The method of claim 1 wherein the parameters comprise at least one of:
a bot activity identifier;
a bot activity type;
a bot activity channel identifier.

11. A system comprising:
a processor coupled to memory storing executable instructions, which when executed by the processor cause the processor to perform operations comprising:
conduct a conversation between a bot and a user at a node, the conversation comprising a plurality of messages exchanged between the bot and the user at the node;
for at least one of the plurality of messages,
identify a plurality of parameters associated with a message between a bot and a user associated with an interaction between the bot and the user, the parameters associated with the message comprising one or more of:
one or more parameters associated with a message received by the bot;
one or more parameters associated with a message sent by the bot;
one or more parameters associated with intent and/or slot detection; and
one or more parameters associated with a language understanding model; and
encode the plurality of parameters of the message associated with the interaction between the bot and the user directly into a custom Uniform Resource Identifier (URI) based on a path syntax;
create an analytic record for the node comprising a plurality of custom URIs, each of which is associated with one of the plurality of messages in the conversation; and
submit the analytic record to an analytic system in order to derive analytics related to the conversation.

12. The system of claim 11 wherein the plurality of parameters associated with each message comprise at least one of:

a bot owner;
a bot identifier;
a tenant identifier; and
a dialog identifier.

13. The system of claim 11 wherein the plurality of parameters associated with each message comprises one or more of:
a prompt name
a message identifier; and
an origin.

14. The system of claim 11 wherein the plurality of parameters associated with each message comprise a conversation identifier.

15. The system of claim 11 wherein the plurality of parameters associated with each message comprise a session identifier.

16. The system of claim 11 further comprising encoding the plurality of parameters associated with each message into a custom URI.

17. The system of claim 16 wherein the URI takes a form of:
bot://[list1]/[list2], where:
[list1] is one or more of the plurality of parameters associated with the conversation including a parameter describing owner of the bot; and
[list2] is one or more other of the plurality of parameters associated with the conversation, where multiple parameters are separated by a '/' character.

18. The system of claim 17 wherein the analytic system is an analytic system tailored to compiling analytics for web sites.

19. The system of claim 11 wherein the plurality of parameters associated with each message comprise one or more sentiment parameters.

20. A hardware computer storage device comprising executable instructions that, when executed by a processor of a machine, cause the machine to perform acts comprising:
conduct a conversation between a bot and a user at a node, the conversation comprising a plurality of messages exchanged between the bot and the user at the node;
for each of the plurality of messages,
identify a plurality of parameters associated with a message between the bot and the user associated with an interaction between the bot and the user, the plurality of parameters comprising one or more of:
one or more parameters associated with a bot message received;
one or more parameters associated with a bot message send;
one or more parameters associated with intent and/or slot detection; and
one or more parameters associated with a language understanding model; and
encode the plurality of parameters of the message associated with the interaction between the bot and the user directly into a custom Uniform Resource Identifier (URI) based on a path syntax;
create an analytic record for the node comprising a plurality of custom URIs, each of which is associated with one of the plurality of messages in the conversation; and
submitting the analytic record to an analytic system in order to derive analytics related to the conversation.

* * * * *